(12) United States Patent
Maeda

(10) Patent No.: US 7,460,169 B2
(45) Date of Patent: Dec. 2, 2008

(54) ELECTRONIC CAMERA

(75) Inventor: Yutaka Maeda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1214 days.

(21) Appl. No.: 10/678,086

(22) Filed: Oct. 6, 2003

(65) Prior Publication Data

US 2004/0066461 A1  Apr. 8, 2004

Related U.S. Application Data

(62) Division of application No. 09/440,624, filed on Nov. 16, 1999.

(30) Foreign Application Priority Data

Nov. 18, 1998 (JP) .................................. 10-328494

(51) Int. Cl.
*H04N 5/225* (2006.01)
*H04N 5/222* (2006.01)
(52) U.S. Cl. .............. 348/371; 348/333.01; 348/333.02
(58) Field of Classification Search .................. 348/371, 348/333.01, 333.02
See application file for complete search history.

(56) References Cited

U.S. PATENT DOCUMENTS 5,448,331 A * 9/1995 Hamada et al. ............. 396/106
5,576,762 A   11/1996 Udagawa
6,115,557 A    9/2000 Maeda et al.
6,239,837 B1 * 5/2001 Yamada et al. ........... 348/231.5

FOREIGN PATENT DOCUMENTS

JP    4-90524 A   3/1992
JP    9-98333 A   4/1997

* cited by examiner

*Primary Examiner*—James M Hannett
(74) *Attorney, Agent, or Firm*—Birch, Stewart, Kolasch & Birch, LLP

(57) ABSTRACT

An electronic camera that makes it possible to determine an image-capturing angle of view by displaying a live image on an LCD before a still image-recording even if the object is dark. When the live image is displayed, a cycle for outputting image signals in one field from a CCD can be changed to another cycle; e.g., from a normal video rate of 1/60 second to 1/30 second. Therefore, the exposure time of the CCD can be longer than the normal exposure, and thus, the live image with a suitable brightness can be displayed on the LCD even if the object is dark. The electronic camera is provided with an electronic flash that can be intermittently activated by switching on a switch or automatically if the object is dark before the image recording. This enables the display of the live image with the suitable brightness on the display even if the object is so dark as to require the electronic flash, and the image-capturing angle of view can be determined in view of the live image on the display.

10 Claims, 5 Drawing Sheets

F I G. 1
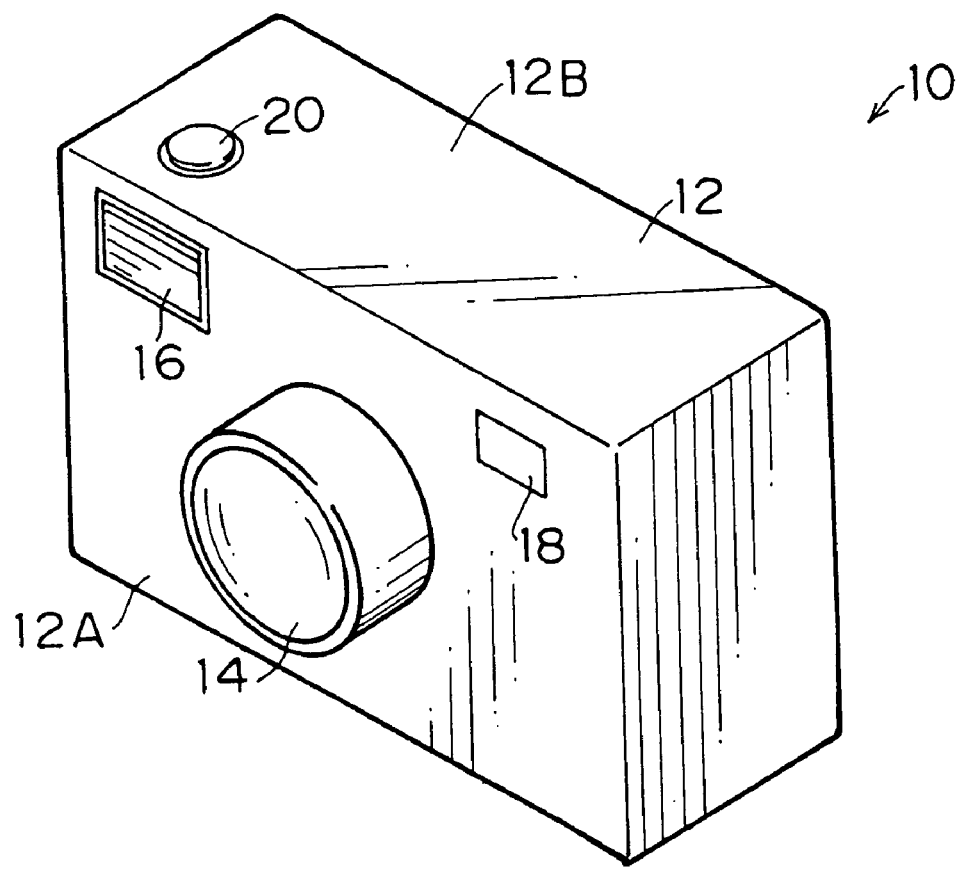

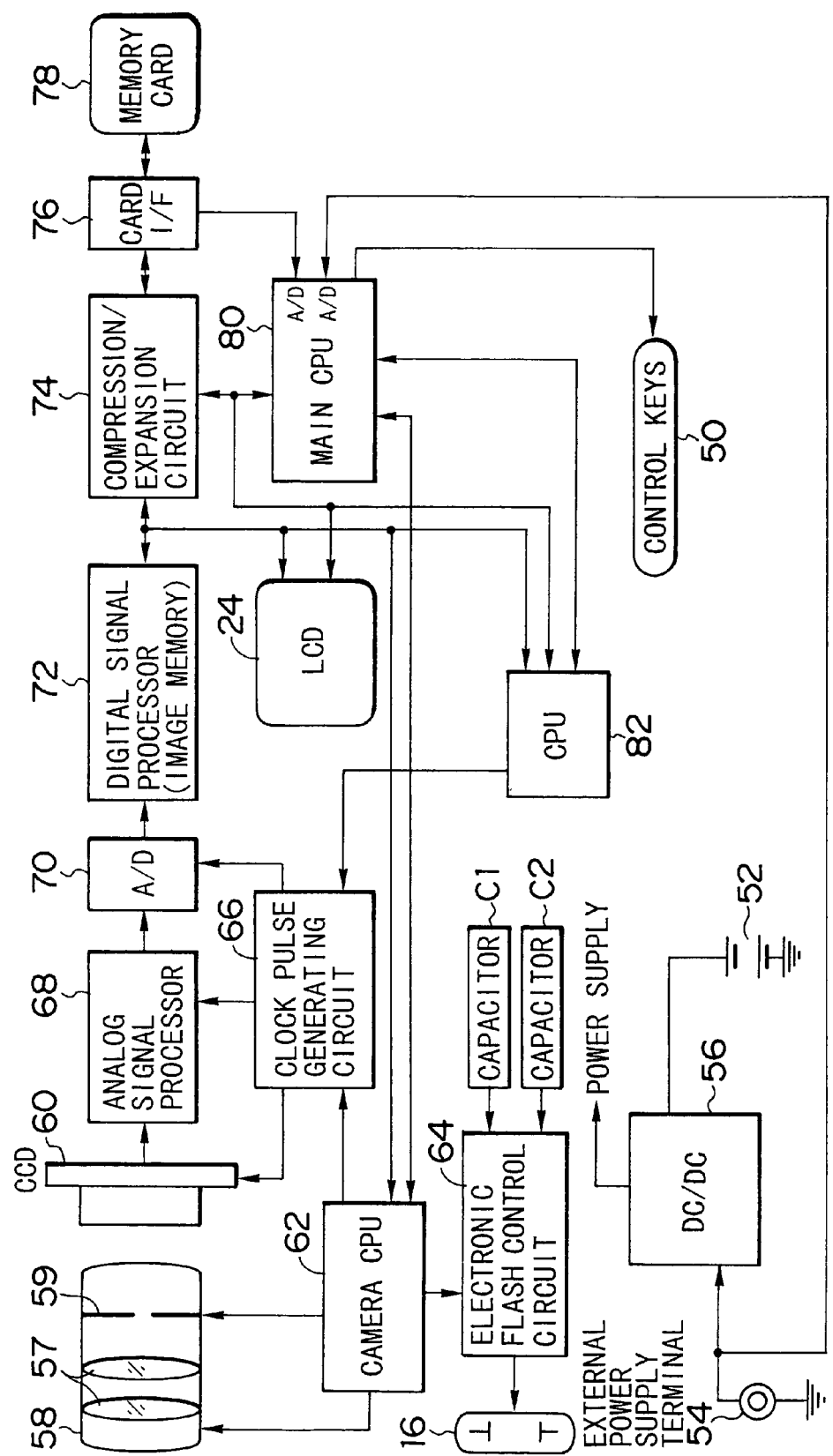
F I G. 3

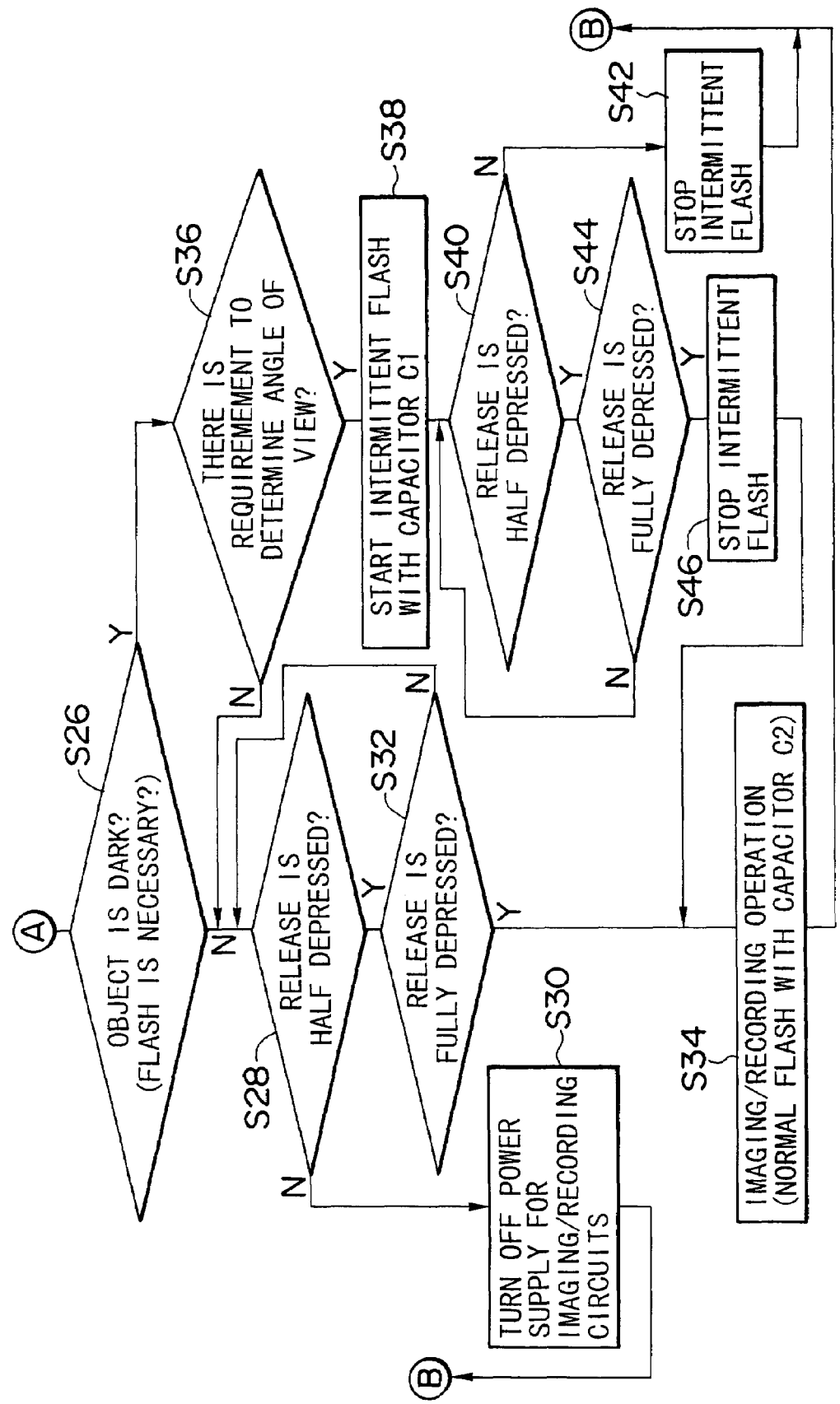
F I G. 4 (B)

ELECTRONIC CAMERA

This application is a divisional of co-pending application Ser. No. 09/440,624, filed on Nov. 16, 1999, the entire contents of which are hereby incorporated by reference and for which priority is claimed under 35 U.S.C. § 120; and this application claims priority of Application No(s). 10-328494 filed in Japan on Nov. 18, 1998 under 35 U.S.C. § 119.

BACKGROUND OF THE INVENTION

1. Field of the Invention

The present invention relates generally to an electronic camera, and more particularly to an electronic camera that is capable of ideally determining an image-capturing angle of view for a dark object.

2. Description of Related Art

One of the well-known electronic cameras such as a digital still camera has a liquid crystal display (LCD) for displaying image-capturing conditions, recorded images, etc. This electronic camera is capable of displaying a live image on the LCD at the moment of capturing the image through an imaging device before recording of a still image. Thus, the LCD can be used as a finder to determine the image-capturing angle of view and what is included in an image to be recorded. When the live image is displayed on the LCD, however, the maximum exposure time of the imaging device is fixed at a video rate (e.g., 1/60 second for an NTSC signal). For this reason, there is a limit to the adjustment of the exposure time of the imaging device, and if the object is very dark, the live image displayed on the LCD is too dark to determine the image-capturing angle of view.

There is also a well-known electronic camera provided with an optical finder along with or without the LCD. In this electronic camera, the optical finder, not the LCD, can be used to determine the image-capturing angle of view to thereby reduce the consumption of the electricity. The optical finder enables the user to determine the image-capturing angle of view for the dark object that could not be determined on the LCD. However, it is impossible to directly determine by the optical finder an image actually-captured by the CCD, and therefore, it is more difficult to acquire a desired image compared with the case of using the LCD as the finder. Moreover, if the object is very dark, the image-capturing angle of view sometimes cannot be determined even with the optical finder.

There is another well-known electronic camera provided with a preview capturing function of capturing an image in the same manner as in the regular image-recording, displaying the captured image on the LCD, and storing the captured image in a storage medium such as a memory card if the image is a desired one after the user looks over the image. Even if the object is dark, this electronic camera is able to acquire a preview image with a proper brightness by using an electronic flash, and the image-capturing angle of view can be determined in view of the preview image. This determination of the image-capturing angle of view in the preview capturing, however, aims at knowing whether the image that has been captured is a desired one or not. If the object is dark in particular, it is difficult to acquire a desired image without failure in one image-capturing as stated above. Moreover, once the electronic flash is activated in the preview capturing, the next image-capturing with the electronic flash cannot be started until a capacitor for the electronic flash is sufficiently recharged. For this reason, there is a possibility of missing a good opportunity for an image recording.

SUMMARY OF THE INVENTION

In view of the foregoing, it is an object of the present invention to provide an electronic camera, which makes it possible to determine the image-capturing angle of view even if the object is dark.

To achieve the above-mentioned object, an electronic camera, comprising: an imaging device which captures an image of an object in a cycle by exposure for a period corresponding to the cycle, and outputs image signals updated in the cycle; a changing device which changes the cycle of the imaging device; a display; and a controller which makes the display to display the image according to the image signals while the imaging device is capturing the image, whereby shows a live image on the display to enable determination of an image-capturing angle of view.

According to the present invention, the cycle for outputting the image signals from the imaging device can be changed to arbitrarily change the maximum exposure time of the imaging device. Thus, it is possible to display the live image on the display with the suitable brightness even if the object is dark. This enables the image-capturing angle of view to be determined in view of the live image on the display even if the object is dark.

The present invention is also directed to an electronic camera, comprising: an electronic flash which throws light on recording of an image; a switch; and a controller which intermittently activates the electronic flash upon turning on of the switch, whereby enables determination of an image-capturing angle of view before the recording of the image.

According to the present invention, the electronic flash can be intermittently activated before the image recording, and thus, it is possible to determine the image-capturing angle of view by brightening the dark object. If the object is at a short distance, the image-capturing angle of view can be determined even when there is no light at all.

The present invention is also directed to an electronic camera, comprising: an imaging device which captures an image of an object in a cycle by exposure for a period corresponding to the cycle, and outputs image signals updated in the cycle; a display; a display controller which makes the display to display the image according to the image signals while the imaging device is capturing the image; an electronic flash which throws light on recording of an image; and a flash controller which intermittently activates the electronic flash before the recording of the image; wherein a live image of the object illuminated with the electronic flash is shown on the display to enable determination of an image-capturing angle of view before the recording of the image.

According to the present invention, the electronic flash can be intermittently activated before the image recording by switching on a switch or automatically if the object is dark. This enables the display of the live image with the suitable brightness on the display even if the object is so dark as to require the electronic flash, and the image-capturing angle of view can be determined in view of the live image on the display.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a front perspective view showing an electronic camera according to an embodiment of the present invention;

FIG. 3 is a block diagram of the electronic camera according to the embodiment of the present invention.

DETAILED DESCRIPTION OF THE PREFERRED EMBODIMENT

This invention will be described in further detail by way of example with reference to the accompanying drawings.

Figure 2:
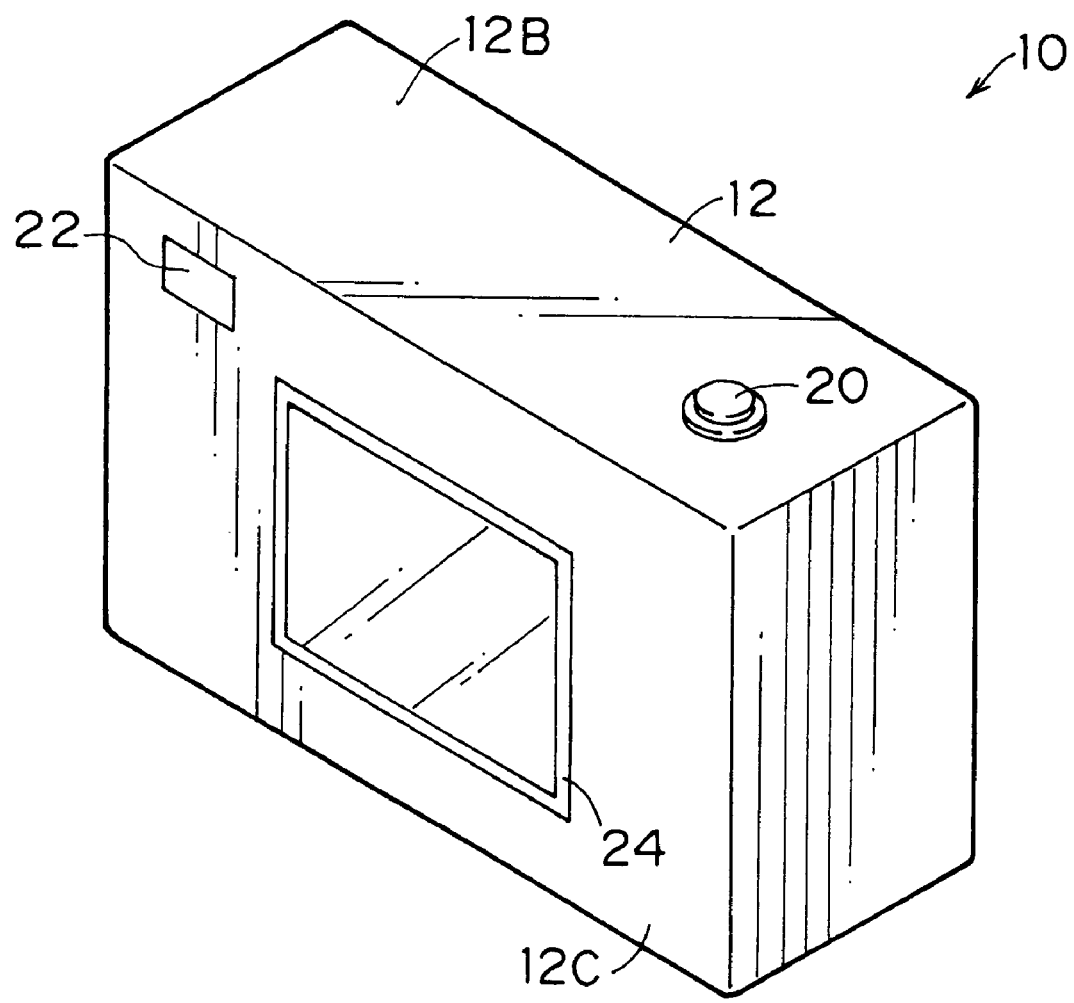
FIG. 2 is a back perspective view showing the electronic camera in FIG. 1.

FIGS. 1 and 2 are a front perspective view and a back perspective view, respectively, showing an electronic camera 10 according to an embodiment of the present invention. As shown in FIG. 1, the electronic camera 10 comprises a body 12 and a taking lens 14, which is arranged at a front 12A of the body 12. An object image is formed by the taking lens 14 and converted into an image signal by a charge coupled device (CCD) 60, which is provided in the body 12 (see FIG. 3). An electronic flash 16 is provided at the upper left corner of the front 12A of the body 12, and a finder window 18 for an optical finder is formed at the upper right corner of the front 12A.

A shutter release button 20 is arranged at a top 12B of the body 12. Although not illustrated in detail, half depression of the shutter release button 20 turns on a first switch, and full depression of the shutter release button 20 turns on a second switch. When the first switch is turned on, the electronic camera 10 starts to prepare to record an image. When the second switch is turned on, an image captured through the CCD 60 is stored in a memory card 78 (see FIG. 3) inserted in the body 12.

As shown in FIG. 2, an eyepiece 22 for the optical finder is arranged at the upper left corner of a back 12C of the body 12. The eyepiece 22 enables the user to view a field that substantially corresponds to an image-capturing angle of view.

An LCD 24 is arranged at the back 12C of the body 12, and an image captured by the CCD 60, etc are displayed on the LCD 24. While the LCD 24 is in operation, it shows a real-time live image that is currently captured by the CCD 60. Thus, the user can determine the image-capturing angle of view with reference to the image shown on the LCD 24.

In addition to the members illustrated in FIGS. 1 and 2, a variety of control keys 50 (see FIG. 3) such as a power supply switch are arranged on the camera body 12.

FIG. 3 is a block diagram of the electronic camera 10. When the power supply switch, which is one of control keys 50, is pressed, a battery 52 or an external power source connected to a terminal 54 supplies power to the electronic camera 10 through a DC/DC converter 56 to thereby activate each circuit.

When an object image is captured, i.e., when the live image is displayed on the LCD 24, or when the shutter release button 20 is half-depressed or fully depressed, the electronic camera 10 captures the image light of the object through an optical unit 58, which comprises optical members such as a focus lens 57 and a diaphragm 59, and forms the image of the object on a light receiving surface of the CCD 60. A camera CPU 62 outputs drive signals to drive the focus lens 57 and the diaphragm 59 of the optical unit 58, and thereby controls auto-focusing (AF) and automatic exposure (AE) of the optical unit 58. If the camera CPU 62 determines that it is necessary to use the electronic flash 16 in the image-capturing, it instructs an electronic flash control circuit 64 to activate the electronic flash (e.g., a xenon tube) 16. The electronic flash control circuit 64 controls the charge in capacitors C1 and C2, and the discharge from the capacitors C1 and C2 to the electronic flash 16, which will be described later in further detail.

The CCD 60 converts the image light, which is formed on the light receiving surface thereof, into signal electric charge in quantity corresponding to the quantity of the image light. The signal electric charge is stored in a storage electrode and is read into a shift register according to shift gate pulses inputted from a clock pulse generating circuit 66. The read signal electric charge is sequentially sent into an analog signal processor 68 as voltage signals (image signals) corresponding to the signal electric charge according to register transfer pulses inputted from the clock pulse generating circuit 66. The CCD 60 is connected to a shutter drain through a shutter gate, which is driven by shutter gate pulses inputted from the clock pulse generating circuit 66 so that the signal electric charge is discharged from the storage electrode into the shutter drain. The charge storage time (the exposure time) of the CCD 60 is thus controlled with the shutter gate pulses inputted from the clock pulse generating circuit 66. The camera CPU 62 controls the output timing of the shutter gate pulses through the clock pulse generating circuit 66, thereby controlling the exposure time of the CCD 60. The camera CPU 62 controls the exposure by controlling the exposure time of the CCD 60 and by controlling the diaphragm 59 in the optical unit 58.

The analog signal processor 68 performs analog signal processing such as a white balance adjustment and a gamma correction for the image signals read from the CCD 60, and outputs the processed image signals to an A/D converter 70. The A/D converter 70 converts the analog image signals into digital image data, which is transferred to a digital signal processor 72. The analog signal processor 68 and the A/D converter 70 are synchronized with the CCD 60 according to clock pulses inputted from the clock pulse generating circuit 66.

The digital signal processor 72 performs digital signal processing for the image data, and converts the image data into a data format that is suitable to be displayed on the LCD 24 or stored in the memory card 78. The converted data is temporarily stored in an image memory in the digital signal processor 72. To display the live image on the LCD 24, the image data stored in the image memory of the digital signal processing part 72 is transmitted to the LCD 24, which shows the image. In this case, the image data in the image memory is sequentially updated to new image data about images currently captured through the CCD 60. The updated image data is transmitted to the LCD 24. To record the image data in the memory card 78, the image data in the image memory is transferred to a compression/expansion circuit 74, which compresses the image data. The compressed image data is recorded in the memory card 78 through a card interface 76.

A main CPU 80 supervises the whole circuit, and a CPU 82 mainly controls the clock pulse generating circuit 66, which will be described later in further detail.

A description will now be given of the control for making it possible to properly determine the angle of view even if the object is dark. First, a description will be given of the control for increasing the maximum exposure time of the CCD 60 and the brightness of the live image on the LCD 24.

When the main CPU 80 detects that the LCD 24 is turned on by a display switch among the control keys 50, the main CPU 80 instructs the CPU 82 to start controlling the display of the live image. On input of the instruction from the main CPU 80, the CPU 82 informs the clock pulse generating circuit 66 of the timing for outputting the pulses. Accordingly, the clock pulse generating circuit 66 outputs the shift gate pulses, the register transfer pulses and the shutter gate pulses to the CCD 60, and outputs the clock pulses to the analog signal processor 68 and the A/D converter 70.

When the LCD 24 is turned on, the CPU 80 instructs the camera CPU 62 to start the AE control and the AF control. The camera CPU 62 receives the image data from the digital signal processor 72 as mentioned above, and determines the focusing and brightness of the captured image according to the received image data. Then, the main CPU 80 drives the focus lens 57 and the diaphragm 59, and adjusts the exposure time of the CCD 60 through the clock pulse generating circuit 66 to control the AF and the AE.

As stated previously, the CPU 82 informs the clock pulse generating circuit 66 of the timing for outputting the necessary pulses. Normally, the output cycle of the pulses is determined so that the processing time for the image signals in one field can be equal to a video rate of 1/60 second for the video signals in one field in the National Television System Committee (NTSC) format. More specifically, the image signals are read from the CCD 60 at a rate (cycle) of 1/60 second per field, and the analog signal processor 68 and the A/D converter 70 process the image signals read from the CCD 60 at a rate (cycle) of 1/60 second per field. Hence, the exposure time of the CCD 60 is regulated by an image signal reading rate, and the maximum exposure time is limited to 1/60 second. If the exposure time is restricted within this range, the image displayed on the LCD 24 is dark when the object is very dark. In this case, the angle of view cannot be determined in view of the live image displayed on the LCD 24.

To solve this problem, the electronic camera 10 of this embodiment is able to change the rate for reading the image signals from the CCD 60 (the cycle for reading the image signals in one field) and the rate for processing the signals by the analog signal processor 68 and the AID converter 70 (the cycle for processing the signals in one field) according to the brightness of the image. This enables the exposure time of the CCD 60 to be set longer than the maximum 1/60 second, and enables the live image with suitable brightness to be displayed on the LCD 24 even if the object is very dark.

When the camera CPU 62 determines that the exposure time of the CCD 60 must be longer than 1/60 second in order to control the AE, the camera CPU 62 instructs the main CPU 80 to lengthen the image signal reading and processing cycle (hereinafter referred to as an imaging cycle). Accordingly, the main CPU 80 changes the imaging cycle to 1/30 second, and informs the CPU 82 of the changed cycle. Consequently, the CPU 82 controls the output timing of the pulses outputted from the clock pulse generating circuit 66 in order to operate the CCD 60, the analog signal processor 68 and the A/D converter 70 in the changed imaging cycle. The CPU 62 also controls the exposure time of the CCD 60 in the changed imaging cycle.

The imaging cycle may be changed not only to 1/30 second but also to 1/15 second, substantially 1/8 second, substantially 1/4 second, substantially 1/2 second, substantially 1 second . . . by doubling in accordance with the brightness of the object. The image signal processing cycle may be set not only by such steps but also at gradual values.

Consequently, the image with the suitable brightness can be displayed on the LCD 24 even if the object is very dark, and the image-capturing angle of view can be determined in view of the live image displayed on the LCD 24 without using the optical finder.

In the above description, the brightness of the object is determined automatically, and the imaging cycle is changed automatically in accordance with the determined brightness of the object. This invention, however, should not be restricted to this. The user may manually change the imaging cycle to adjust the brightness of the live image.

A description will now be given of the control for making it possible to determine the image-capturing angle of view by using the electronic flash 16 when the object is dark.

When the main CPU 80 detects the half depression of the shutter release button 20 among the control keys 50 (i.e., when the first switch of the shutter release button 20 is turned on), the main CPU 80 transmits an S1 signal indicating the half depression of the shutter release button 20 to the camera CPU 62, which then starts controlling the AE and the AF. If the LCD 24 is off, the main CPU 80 turns on the power supply for the imaging/recording circuits such as the CCD 60, the analog signal processor 68, the A/D converter 70, the digital signal processor 72, the compression/expansion circuit 74 and the card interface 76.

Upon input of the S1 signal, the camera CPU 62 determines whether the electronic flash 16 should be activated or not (i.e., whether the brightness of the object is lower than a predetermined threshold or not) in accordance with the brightness of the captured image. If the CPU 62 determines that it is necessary to activate the electronic flash 16, it instructs the electronic flash control circuit 64 to intermittently activate the electronic flash 16. The electronic flash 16 continues to intermittently produce flashes of light for the object while the shutter release button 20 is half depressed. Since the purpose of the intermittent flash is to determine the image-capturing angle of view, the electronic flash control circuit 64 discharges the electric charge little by little from the capacitor C1 to the electronic flash 16 so that the electronic flash 16 can flash with a smaller quantity of light than in the normal flash. For example, the intermittent flash with 1% of the quantity of normal flash enables more than sixty times of continuous intermittent-flash. Thus, the half depression of the shutter release button 20 makes it possible to determine the image-capturing angle of view on the optical finder or the LCD 24 even if the object is dark.

When the main CPU 80 detects the full depression of the shutter release button 20 (i.e., when the second switch of the shutter release button 20 is turned on), it transmits an S2 signal indicating the full depression of the shutter release button 20 to the camera CPU 62. Upon input of the S2 signal, the camera CPU 62 instructs the electronic flash control circuit 64 to discharge the electric charge from the capacitor C2 to the electronic flash 16 so as to fully (normally) activate the electronic flash 16. The image captured by the CCD 60 is processed in the imaging/recording circuits and is recorded in the memory card 78 as stated previously.

Figure 4:
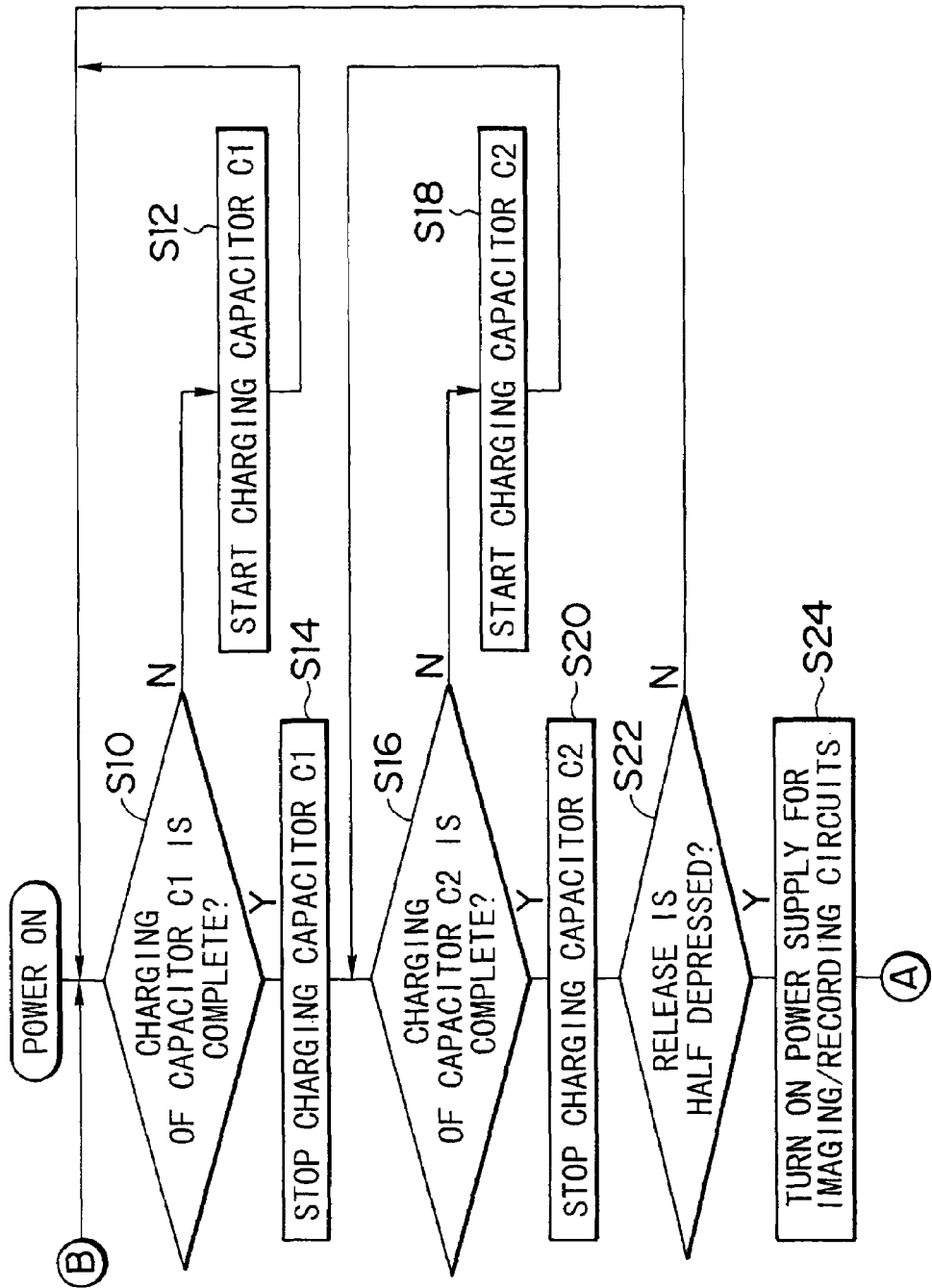
FIGS. 4(A) and 4(B) are a flow chart showing the procedure for activating an electronic flash.

FIGS. 4(A) and 4(B) are a flow chart showing the procedure for activating the electronic flash 16. While the shutter release button 20 is not depressed, the electronic flash control circuit 64 determines whether the charging of the capacitor C1 is complete or not (S10). If the charging is incomplete, the electronic flash control circuit 64 starts charging the capacitor C1 (S12). If the charging is complete, the electronic flash control circuit 64 stops charging the capacitor C1 (S14).

Then, the electronic flash control circuit 64 determines whether the charging of the capacitor C2 is complete or not (S16). If the charging is incomplete, the electronic flash control circuit 64 starts charging the capacitor C2 (S18). On completion of the charging, the electronic flash control circuit 64 stops charging the capacitor C2 (S20).

Then, the main CPU 80 determines whether the shutter release button 20 is half depressed or not (S22). If the shutter release button 20 is not half depressed at S22, the main CPU 80 repeats the processing from S10. If the shutter release button 20 is half depressed at S22, the main CPU 80 turns on the power supply for the imaging/recording circuits (S24). Then, the camera CPU 62 determines whether the object is dark or not, more specifically, the electronic flash 16 should be activated or not (S26). If the electronic flash is determined as being unnecessary at S26, the main CPU 80 determines whether the shutter release button 20 remains half depressed or not (S28). If the half depression is cancelled and the shutter release button 20 is determined as being not half depressed at S28, the main CPU 80 turns off the power supply for the imaging/recording circuits (S30) to return to S10.

On the other hand, if the shutter release button 20 is determined as being half depressed at S28, then the main CPU 80 determines whether the shutter release button 20 is fully depressed or not (S32). If the shutter release button 20 is not fully depressed at S32, the main CPU 80 repeats the processing from S28. If the shutter release button 20 is fully depressed at S32, the electronic flash control circuit 64 discharges the electric charge from the capacitor C2 to the electronic flash 16 so as to normally activate the electronic flash 16 and instructs the imaging/recording circuits to record the image captured by the CCD 60 in the memory card 78 (S34).

If the electronic flash 16 is determined as being necessary since the object is dark at S26, the camera CPU 62 determines whether there is a requirement from the main CPU 80 to activate the electronic flash 16 in order to determine the angle of view (S36). The user operates one of the control keys 50 to set whether the electronic flash 16 is to be intermittently activated or not in order to determine the angle of view. If there is no requirement to intermittently activate the electronic flash 16 at S36, the process goes to the above-mentioned S28 so as not to intermittently activate the electronic flash 16. On the other hand, if there is a requirement to intermittently activate the electronic flash 16 at S36, the camera CPU 62 instructs the electronic flash control circuit 64 to intermittently discharge the electric charge from the capacitor C1 to the electronic flash 16 to thereby start the intermittent flash of the electronic flash 16 (S38). Then, the main CPU 80 determines whether the shutter release button 20 remains half-depressed or not (S40). If the shutter release button 20 is not half depressed at S40, the main CPU 80 instructs the camera CPU 62 to stop the intermittent flash (S42) and returns to S10. If the shutter release button 20 is half depressed at S40, the main CPU 80 determines whether the shutter release button 20 is fully depressed or not (S44). If the shutter release button 20 is not fully depressed at S44, the main CPU 80 returns to S40. If the shutter release button 20 is fully depressed at S44, the main CPU 80 stops the intermittent flash (S46), and instructs the electronic flash control circuit 64 to discharge the electric charge from the capacitor C2 to the electronic flash 16 to normally activate the electronic flash 16, and also instructs the imaging/recording circuits to record the image captured by the CCD 60 into the memory card 78 (S34).

As stated above, the half depression of the shutter release button 20 enables the intermittent flash of the electronic flash 16, and thus, the image-capturing angle of view can be determined on the optical finder or the LCD 24 even if the object is dark. Moreover, only the capacitor C1 is used for the intermittent flash of the electronic flash 16, and the capacitor C2 provided independently of the capacitor C1 is used for the main image-capturing for recording, which is started by fully depressing the shutter release button 20. This eliminates the disadvantage that the intermittent flash results in the shortage of the electricity for the electronic flash 16 in the main image-capturing, and also eliminates the disadvantage that it takes a lot of time from the intermittent flash to the main image-capturing since the capacitor must be charged with electricity by an amount consumed for the intermittent flash.

In the above description, the electronic flash 16 is intermittently activated when the shutter release button 20 is half depressed, but the present invention should not be restricted to this. It is also possible to provide an electronic flash intermittent activation button and start activating the electronic flash intermittently when the electronic flash intermittent activation button is pressed.

While the LCD 24 is on, the electronic flash 16 is intermittently activated in synchronism with the imaging cycle in order to make good use of the light of the electronic flash 16. For example, if the imaging cycle is $1/15$ second, the electronic flash 16 is intermittently activated every $1/15$ second.

The intermittent flash is particularly effective if the object is at a short distance from the electronic camera 10 or there is no light at all. If the object is at more than a predetermined distance from the electronic camera 10, the intermittent flash may be prohibited since the intermittent flash cannot cause the light to reach the object. More specifically, the electronic flash 16 is intermittently activated only when the object is at a short distance from the electronic camera 10.

The two capacitors C1 and C2 are not necessarily needed in order to activate the electronic flash 16, but only one capacitor with sufficiently large capacity may be provided.

The images captured during the intermittent flash may be recorded in the memory card 78 in order to make possible the continuous image-capturing with the electronic flash being intermittently activated.

As set forth hereinabove, the electronic camera of the present invention makes it possible to change the cycle for outputting the image signals from the imaging device, so that the maximum exposure time of the imaging device can be changed arbitrarily. For this reason, the live image with the suitable brightness can be displayed on the display even if the object is dark, and the image-capturing angle of view can be determined in view of the live image on the display. Thus, the object can be determined before the image-capturing even if the object is dark, and the main image-capturing for recording can be started immediately after the determination.

Moreover, the intermittent flash of the electronic flash before the still image-recording brightens the dark object to enable the determination of the image-capturing angle of view. If the object is located at a short distance from the electronic camera, the image-capturing angle of view can be determined even if there is no light at all.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera, comprising:
   an electronic flash which throws light on recording of an image;
   a switch;
   a controller which intermittently activates the electronic flash upon turning on of the switch, thereby enabling determination of an image-capturing angle of view before the recording of the image;
   a first capacitor from which the electronic flash is supplied with electricity before the recording of the image; and
   a second capacitor from which the electronic flash is supplied with electricity on the recording of the image;
   wherein the first and second capacitors are provided independently of one another.

2. The electronic camera as defined in claim 1, wherein a quantity of light thrown by the electronic flash before the recording of the image is smaller than a quantity of the light in the recording of the image.

3. The electronic camera as defined in claim 1, further comprising:
   a shutter release button, full depression of the shutter release button causing the recording of the image;
   wherein the switch is turned on upon half depression of the shutter release button.

4. An electronic camera, comprising:
   an imaging device which captures an image of an object in a cycle by exposure for a period corresponding to the cycle, and outputs image signals updated in the cycle;
   a display;
   a display controller which makes the display to display the image according to the image signals while the imaging device is capturing the image;
   an electronic flash which throws light on recording of an image;
   a flash controller which intermittently activates the electronic flash before the recording of the image;
   a first capacitor from which the electronic flash is supplied with electricity before the recording of the image; and
   a second capacitor from which the electronic flash is supplied with electricity on the recording of the image;
   wherein the first and second capacitors are provided independently of one another, and
   wherein a live image of the object illuminated with the electronic flash is shown on the display to enable determination of an image-capturing angle of view before the recording of the image.

5. The electronic camera as defined in claim 4, further comprising a changing device which is manually operated to change the cycle of the imaging device.

6. The electronic camera as defined in claim 4, further comprising a changing device which automatically changes the cycle of the imaging device.

7. The electronic camera as defined in claim 4, further comprising:
   a switch;
   wherein the flash controller intermittently activates the electronic flash upon turning on of the switch.

8. The electronic camera as defined in claim 7, further comprising:
   a shutter release button, full depression of the shutter release button causing the recording of the image;
   wherein the switch is turned on upon half depression of the shutter release button.

9. The electronic camera as defined in claim 4, wherein the flash controller intermittently activates the electronic flash when brightness of the image is lower than a predetermined threshold.

10. The electronic camera as defined in claim 4, wherein a quantity of light thrown by the electronic flash before the recording of the image is smaller than a quantity of the light in the recording of the image.

* * * * *